United States Patent
Gerino et al.

(10) Patent No.: US 9,758,412 B2
(45) Date of Patent: Sep. 12, 2017

(54) DEVICE FOR PURIFYING LIQUID WASTEWATER, AND METHOD FOR CLEANING LIQUID WASTEWATER USING SAID DEVICE

(71) Applicants: Magali Gerino, Odars (FR); Philippe Vervier, Escalquens (FR); Jose Miguel Sanchez Perez, Roques (FR); Laury Gauthier, Toulouse (FR)

(72) Inventors: Magali Gerino, Odars (FR); Philippe Vervier, Escalquens (FR); Jose Miguel Sanchez Perez, Roques (FR); Laury Gauthier, Toulouse (FR)

(73) Assignees: CENTRE NATIONAL DE LA RECHERCHE SCIENTIFIQUE (C.N.R.S.), Paris (FR); INSTITUT NATIONAL POLYTECHNIQUE DE TOULOUSE, Toulouse (FR); UNIVERSITÉ PAUL SABATIER (TOULOUSE III), Toulouse (FR)

( * ) Notice: Subject to any disclaimer, the term of this patent is extended or adjusted under 35 U.S.C. 154(b) by 361 days.

(21) Appl. No.: 14/371,793

(22) PCT Filed: Jan. 8, 2013

(86) PCT No.: PCT/FR2013/050033
§ 371 (c)(1),
(2) Date: Jul. 11, 2014

(87) PCT Pub. No.: WO2013/104857
PCT Pub. Date: Jul. 18, 2013

(65) Prior Publication Data
US 2014/0374343 A1 Dec. 25, 2014

(30) Foreign Application Priority Data
Jan. 12, 2012 (FR) .................... 12 00091

(51) Int. Cl.
*C02F 3/32* (2006.01)
*C02F 3/04* (2006.01)
*C02F 3/10* (2006.01)
*C02F 101/16* (2006.01)
*C02F 101/30* (2006.01)
*C02F 103/00* (2006.01)

(52) U.S. Cl.
CPC .............. *C02F 3/32* (2013.01); *C02F 3/104* (2013.01); *C02F 3/04* (2013.01); *C02F 3/10* (2013.01); *C02F 2101/163* (2013.01); *C02F 2101/306* (2013.01); *C02F 2103/001* (2013.01); *C02F 2103/007* (2013.01); *C02F 2203/006* (2013.01); *C02F 2305/06* (2013.01); *Y02W 10/15* (2015.05)

(58) Field of Classification Search
CPC .. Y02W 10/18; C02F 3/06; C02F 3/32; C02F 3/104; C02F 3/327; C02F 3/34; A01K 61/00
USPC ................... 210/602, 615; 119/200
See application file for complete search history.

(56) References Cited

U.S. PATENT DOCUMENTS

| 3,503,876 A | 3/1970 | Stone | |
|---|---|---|---|
| 2005/0155930 A1* | 7/2005 | Tunnacliffe | C02F 1/34 210/620 |

FOREIGN PATENT DOCUMENTS

| WO | 02/055442 A1 | 7/2002 |
|---|---|---|
| WO | 2005/097688 A1 | 10/2005 |

OTHER PUBLICATIONS

Mermillod et al.: "Testing the effect of *Limnodrilus* sp. (Oligochaeta, tubificidae) on organic matter and nutrient processing in the hyporheic zone; a microcosm method", Arch. Hydrobiol, 149m 3 p. 467-487, Stuttgart, Oct. 2000.
Merritt R. W. et al.: "Ecology and Distribution of Aquatic Insects", An Introduction to the Aquatic Insects of North America, p. 59-64.
International Search Report, dated Apr. 4, 2013, from corresponding PCT application.

* cited by examiner

*Primary Examiner* — Claire Norris
(74) *Attorney, Agent, or Firm* — Young & Thompson

(57) ABSTRACT

A device for purifying liquid wastewater, includes: a container suitable for retaining a granulate consisting of solid particles, and for enabling the contact between the solid particles of the granulate and the liquid wastewater flowing in the container between: an inlet for the liquid wastewater to flow into the container, and an outlet for substantially decontaminated water to flow out of the container; a community of microorganisms extending so as to be in contact with the solid particles of the granulate; at least one live benthic invertebrate whose mean size is greater than 250 μm and which is distributed in the granulate; and at least one live benthic invertebrate whose mean size is from 50 μm to 250 μm and which is distributed in the granulate, characterized in that the community of macrobenthic organism and meiobenthic organism species includes a proportion of 60% to 80% of invertebrate detrivorous organisms.

16 Claims, No Drawings

DEVICE FOR PURIFYING LIQUID WASTEWATER, AND METHOD FOR CLEANING LIQUID WASTEWATER USING SAID DEVICE

FIELD OF THE INVENTION

The invention relates to a device for sanitizing liquid wastewater and to a method for sanitizing liquid wastewater using such a device. In particular, the invention relates to such a sanitizing device and to a method for sanitizing liquid wastewater for the purpose of its detoxification. In particular, the invention relates to a device and a method for sanitizing water contaminated by nitrogen, particularly in the form of nitrate, nitrite or ammonia, and/or by at least one plant protection compound, particularly by a biocide. This can be water from a water table which originates from the surface runoff of rainwater and which is contaminated during the leaching of soils that are polluted, particularly by fertilizers such as nitrates or by plant protection compounds used in agriculture. The invention also relates to a method for sanitizing liquid water, particularly runoff water, domestic wastewater or industrial water contaminated by medicinal compounds or wastewater of agricultural origin, in which such a liquid wastewater sanitizing device is employed.

Such a device and method have applications in the field of the sanitation of liquid water, particularly runoff water, domestic wastewater or contaminated industrial water, for which environmentally friendly solutions are sought.

The present invention is directed to proposing a device and a method for sanitizing liquid wastewater, particularly runoff water, domestic wastewater or contaminated industrial water, capable of being used on a reduced scale at laboratory or residential level, but also on an industrial scale at the level of an industrial and/or agricultural water treatment plant.

Analytical devices, referred to as "microcosms", are already known, which are suitable for modeling and permitting the study of the role of oligochaete worms in the treatment of organic matter and nutrient in the hyporheic zone. Such a device, described in (Mermillod-Blondin et al., (2000) *Arch. Hydrobiol.*, 149; 3, 467-487), comprises a filter column containing a stationary filtering phase made up of superimposed alternate layers of gravel and sand, said stationary filtering phase being suitable for permitting the flow of water, the sand of the filtering phase having being placed in contact with a composition of bacteria prior to being placed in the filtration device, said filtering phase additionally comprising 50 or 100 worms of an oligochaete species selected from the oligochaete worms *Limnodrilus hoffineisteri*, the oligochaete worms *Limnodrilus claparedeanus* and *Tubifex tubifex* oligochaete worms, each oligochaete worm having a volume of the order of 4 mm$^3$.

Such a device is limited in its applications to the study and the modeling of the role of oligochaete worms at the solid/liquid interface of a filter column. It does not permit the sanitation of wastewater with regard to agricultural fertilizers, in particular nitrates, and/or to plant protection compounds, particularly biocides. Such a device is additionally limited in its structure to a device comprising oligochaete worms.

From WO 02/055442, a device for the treatment of an effluent in the sea is also known.

SUMMARY OF THE INVENTION

The present invention is directed to overcoming the disadvantages referred to above by providing a device and a method for sanitizing liquid wastewater biologically. In particular, such a device and method do not require the use of chemical compounds for neutralizing fertilizers and/or plant protection compounds.

The invention is directed in particular to a device and a method for sanitizing liquid wastewater having improved sanitizing efficiency compared with biological treatments employing only microorganisms.

The invention is also directed to achieving all of these objects at reduced cost by proposing a low-cost liquid wastewater sanitizing device made from means, particularly from live organisms, that are available on the submerged solid surface of a natural watercourse or an artificial watercourse, particularly in a rearing pond.

The invention is additionally directed to proposing such a device and method for sanitizing liquid wastewater which preserves the working habits of staff, is easy to use and can be implemented in only a few operations.

To this end, the invention relates to a device for sanitizing liquid wastewater, comprising:
 a container suitable for holding an aggregate made up of solid particles and for permitting contact between the solid particles of the aggregate and said liquid wastewater flowing in said container between:
  an inlet for said liquid wastewater into said container, and;
  an outlet for substantially decontaminated water from the container;
 a community, referred to as a community of microorganisms, of at least one species of microorganism extending on the surface of and in contact with the solid particles of the aggregate and forming a matrix suitable for the development of said community of microorganisms;
 at least one live benthic invertebrate selected from the group made up of the live benthic invertebrates referred to as macrobenthic organisms, having an average size greater than 250 µm, said macrobenthic organism(s) being distributed in the aggregate;
 at least one live benthic invertebrate selected from the group made up of the live benthic invertebrates referred to as meiobenthic organisms, having an average size of from 50 µm to 250 µm, said meiobenthic organism(s) being distributed in the aggregate,
wherein the macrobenthic organisms and the meiobenthic organisms form a community of one or more species of benthic invertebrate organisms comprising a proportion of detritivorous invertebrate organisms, expressed as a percentage of the dry weight of the detritivorous invertebrate organisms and the dry weight of the benthic invertebrate organisms of said community of one or more species, of from 60% to 80%, particularly of the order of 75%.

DETAILED DESCRIPTION OF THE INVENTION

Throughout the text, "benthic invertebrate" means a live multi-cellular invertebrate organism, in its natural state, in an aquatic medium at the level of the "benthos", i.e. at the liquid/solid interface of a submerged solid substrate (sediments, plants), e.g. of a watercourse, such as a river, stream, marsh or lake. It can refer to multicellular organisms living at said liquid/solid interface in the liquid medium, or multicellular organisms living close to the liquid/solid interface in the solid medium.

Advantageously and according to the invention, the macrobenthic organisms, the meiobenthic organisms and the detritivorous invertebrate organisms are freshwater organisms, i.e. organisms living exclusively in freshwater.

The "average size" of a benthic invertebrate is determined by screening a community of one or more species of live benthic invertebrates through a screen with a square mesh of a predetermined dimension, particularly side dimension, capable of retaining at least part of said community of one or more species of live benthic invertebrates. The live benthic invertebrates retained in the screen are assigned a size at least greater than the predetermined dimension of the square mesh of the screen. By way of example, the use of a screen with a square mesh of 250 μm side dimension permits the retention of live benthic invertebrates of the community of one or more species having an average size greater than 250 μm. It is determined that the average size of live benthic invertebrates of a community of one or more species of live benthic invertebrates is from 50 μm to 250 μm by successively carrying out a first screening step of said community of one or more species of live benthic invertebrates using a square mesh screen of 250 μm side dimension and then a second screening step of the live benthic invertebrates not retained on the 250 μm screen performed by means of a square mesh screen of 50 μm side dimension. The live benthic invertebrates retained on the 50 μm square mesh screen have an average size of from 50 μm to 250 μm.

Advantageously, the device according to the invention comprises a plurality of live benthic invertebrates selected from the group made up of the live benthic invertebrates referred to as macrobenthic organisms, having an average size greater than 250 μm. It additionally comprises a plurality of live benthic invertebrates selected from the group made up of the live benthic invertebrates referred to as meiobenthic organisms, having an average size of from 50 μm to 250 μm.

The detritivorous nature of a macrobenthic organism and a meiobenthic organism is determined with reference to the feeding mode of said macrobenthic or meiobenthic organism. The detritivorous invertebrate organisms include the macrobenthic and meiobenthic organisms feeding:
- on dead organic matter accumulating on the surface of the sediments and in the sediments (referred to as collector organisms);
- on particulate organic matter (referred to as shredder organisms or shredders);
- on the biofilm developing on a mineral or organic support, particularly a live support, (or scrapers) (Merritt R. W. and Cummins K. W., (1984), 2nd Edition, Kendal ed. pp. 59-64; *An introduction to the aquatic insects of North America*).

A device according to the invention comprises an aggregate made up of solid particles. These solid particles can be solid mineral particles, i.e. solid particles not comprising any carbon (with the exception of carbonates). These solid particles can be solid particles of rock in the divided state, particularly sand, gravel or any other mineral aggregate. These solid particles can also be solid organic particles, i.e. solid particles made up of a material comprising carbon. They can be polymers, particularly synthetic polymers, which are insoluble in water and have a particle size suitable for permitting the development of a community of one or more species of microorganism(s) on the surface of said solid particles and the formation of a "biofilm".

Such an aggregate can also comprise particulate organic matter of the plant and animal debris type. Debris of this type is present in particular at the water-sediment interface of the natural environment or in the aggregate collected in the natural environment.

Advantageously, such an aggregate is composed of a solid material in the divided state. It can be a natural sand, particularly collected in the bed of a watercourse. It can also be a construction aggregate or gravel having a particle size suitable for being able to allow a flow of water through the gaps arranged between the solid particles of said aggregate.

Advantageously, such an aggregate is made up of solid particles having a monomodal particle size distribution. Monomodal particle size distribution means a particle size distribution in which the curve, referred to as an envelope curve, of the relative frequencies of the solid particles of an aggregate as a function of the size—or more generally of the logarithm of the size—of said particles can, for example, take the form of a Gaussian. It can be a Gaussian of greater or lesser width.

However, such an aggregate can be made up of solid particles having a multimodal particle size distribution. In this case, the envelope curve of particle size distribution of said solid particles of the aggregate has several distinct peaks. As a non-limiting example, the particle size distribution of the solid particles of the aggregate is a bimodal or multimodal particle size distribution.

Advantageously, the solid particles of the aggregate exhibit a substantially homogeneous spatial distribution in the container. A substantially homogeneous spatial distribution means that the solid particles of the aggregate are distributed in the container substantially homogeneously with regard to their particle size distribution, with all of the solid particles of large size, all of the solid particles of small size and all of the particles of intermediate size each having a substantially homogeneous spatial distribution in the container. It is possible that, in a device according to the invention, the solid particles of the aggregate exhibit a random alternation of layers of solid particles of specific particle size in which the position of each of the layers of solid particles does not depend on the specific particle size. In this sense, a device according to the invention does not exhibit a succession of layers of solid particles in which said layers extend substantially horizontally and are stacked on top of one another according to a decreasing particle size gradient from the deepest layer of solid particles to the layer of solid particles closest to the surface.

It is possible for the solid particles of the aggregate to be distributed in the container in the form of superimposed layers of solid particles, with each layer in the superimposed layer sequence having an average particle size distribution. However, in a device according to the invention, the successive layers of solid particles of different average particle sizes follow one another randomly throughout the height of the device according to the invention.

Advantageously, the solid particles of the aggregate have an average particle size of from 0.1 mm to 20 mm. Advantageously, the solid particles of the aggregate are arranged in the container in the form of successive layers with each layer having an average particle size with a value selected from 0.1 mm, 0.5 mm and 15 mm.

Advantageously, the aggregate of the device according to the invention is suitable to be able to allow its colonization by microbial species present in river water and to form a "biofilm" on the surface of the solid particles of the aggregate.

The inventors believe that the presence of macrobenthic organisms and meiobenthic organisms in the wastewater sanitizing device according to the invention permits grazing and renewal of the community of microorganisms ("biofilm") extending on the surface of the solid particles of the aggregate. The inventors assume that this grazing of the community of microorganisms increases the renewal of the community of microorganisms, permits the selection of a community of microorganisms capable of permitting the degradation of the pollutant(s) presents in the wastewater to be treated and promotes the degradation of the pollutants in the wastewater by the "biofilm" and the production of substantially decontaminated water.

The inventors have observed that the combination of the macrobenthic organism(s) and meiobenthic organism(s), in particular of the community of one or more species of benthic invertebrate organisms comprising a proportion of detritivorous invertebrate organisms of from 60% to 80%, makes it possible to preserve a substantially constant porosity of the aggregate during the use of the sanitizing device by avoiding the clogging of said sanitizing device over time, which is observed in the absence of the community of one or more species of live macrobenthic and meiobenthic invertebrates. This blockage is in fact due to the uncontrolled development of the community of one or more species of microorganisms and to the increase in the level of carbonaceous material in the sanitizing device.

Advantageously, the container is a manufactured container. It can be a filter column or an open wastewater treatment pond.

Advantageously and according to the invention, the aggregate has an average porosity in the container of from 20% to 40%, particularly of the order of 30%. The term "average porosity" of the aggregate means the ratio with respect to 100 between the void volume capable of being occupied by water in the aggregate and the volume of said aggregate. The inventors have observed that this average porosity of the aggregate is suitable on the one hand for permitting the development of a biofilm of microorganisms and the sanitation of liquid wastewater, but also for obtaining a suitable flow rate of water through the aggregate in the container for permitting this sanitation.

Advantageously and according to the invention, the macrobenthic organisms are selected from the group made up of the organisms of the phylum of the hirudineans, the organisms of the phylum of the oligochaetes, the organisms of the phylum of the arthropods, particularly the organisms of the order of the diptera, the organisms of the order of the trichoptera, the organisms of the order of the coleoptera, the organisms of the sub-order of the heteroptera, the organisms of the order of the odonates, the organisms of the order of the plecoptera, the organisms of the order of the ephemeroptera and the organisms of the sub-phylum of the crustaceans, and the organisms of the phylum of the mollusks, particularly the organisms of the class of the gasteropods and the organisms of the class of the bivalves.

Advantageously, the macrobenthic organisms are selected from the group made up of the macrobenthic organisms of the sub-group of the Ancylidae, the sub-group of the Aphelocheirus, the sub-group of the Asellidae, the sub-group of the Athericidae, the sub-group of the Baetidae, the sub-group of the Brachyptera, the sub-group of the Caenidae, the sub-group of the Ceratopogonidae, the sub-group of the Chironominae, the sub-group of the Chrysomelidae, the sub-group of the Dryopidae, the sub-group of the Ecnomidae, the sub-group of the Elmidae, the sub-group of the Empididae, the sub-group of the Ephemerellidae, the sub-group of the Gammaridae, the sub-group of the Haliplidae, the sub-group of the Heptageniidae, the sub-group of the Hydrophilidae, the sub-group of the Hydroptilidae, the sub-group of the Hydropsychidae, the sub-group of the Leptoceridae, the sub-group of the Leuctridae, the sub-group of the Limoniidae, the sub-group of the Lymaeidae, the sub-group of the Naididae, the sub-group of the Nemouridae, the sub-group of the Niphargidae, the sub-group of the Orthocladiinae, the sub-group of the Ptychopteridae, the sub-group of the Potamanthidae, the sub-group of the Rhyacophilidae, the sub-group of the Simuliidae, the sub-group of the Tabanidae, the sub-group of the Taeniopterygidae, the sub-group of the Tanypodinae, the sub-group of the Tipulidae, the sub-group of the Tubificidae, the sub-group of the Polycentropodidae, the sub-group of the Ptychopteridae and of the sub-group of the Psychodidae.

Advantageously and according to the invention, the meiobenthic organisms are selected from the group made up of the organisms of the phylum of the nemathelminths, the organisms of the phylum of the cladocerans, the organisms of the phylum of the rotifers, the organisms of the phylum of the copepods, the organisms of the phylum of the gastrotrichs and the organisms of the phylum of the foraminifers and the organisms of the phylum of the tardigrades.

Advantageously, the meiobenthic organisms are selected from the group made up of the meiobenthic organisms of the sub-group of the Bdelloides, the sub-group of the Brachionus, the sub-group of the Cephalodella, the sub-group of the Cyclopidae or Cyclopoida, the sub-group of the Dicranophorus, the sub-group of the Colurella, the sub-group of the Enchytraeidae, the sub-group of the Euchlanis, the sub-group of the Filinia, the sub-group of the Gastropus, the sub-group of the Harpacticoida, the sub-group of the Hydracarina, the sub-group of the Keratella, the sub-group of the Lecane, the sub-group of the Lepadella, the sub-group of the Lophocharis, the sub-group of the Nauplius, the sub-group of the Notholca, the sub-group of the Pleurotrocha, the sub-group of the Polyarthra, the sub-group of the Proales, the sub-group of the Synchaeta, the sub-group of the Trichocerca, the sub-group of the Trichotria and the sub-group of the Trombidiformes.

Advantageously and according to the invention, the community of microorganisms comprises unicellular microorganisms selected from the group made up of bacteria, algae, fungi and protozoans.

The presence of the community of microorganisms ("biofilm") is determined by methods that are known per se to the person skilled in the art. These methods can be methods of observation of the biofilm, particularly by epifluorescence microscopy, which make it possible to view the live microorganisms extending on the surface of the aggregate. To this end, 1 to 10 mg samples of aggregate are taken from the container, the sampled aggregate is brought into contact with a fluorescent DNA marker (particularly 4',6'-diamidino-2-phenylindole, DAPI) and the live bacterial cells are observed under a magnification of the order of 1000× and with blue light illumination.

It may also involve indirect methods capable of providing a biofilm formation index, i.e. observation of the increase in retention of mineral forms of nitrogen (particularly $NO_3$ by denitrification), or observation of the increase in oxygen consumption beyond the oxygen consumption rate of the water in a water percolation system in the presence of free bacteria.

Advantageously and according to the invention, the macrobenthic organisms are the macrobenthic organisms from a community of at least one species of live benthic invertebrate selected from the group made up of the communities of one or more species of live benthic invertebrate(s) collected from the bed of a natural watercourse, the communities of one or more species of live benthic invertebrate(s) collected from the bed of a modified watercourse, the communities of one or more species of live benthic invertebrate(s) collected from the bed of an artificial watercourse and the communities of one or more species of live benthic invertebrate(s) collected from a rearing pond.

Advantageously and according to the invention, the meiobenthic organisms are the meiobenthic organisms from a community of at least one species of live benthic invertebrates selected from the group made up of the communities of one or more species of live benthic invertebrates collected from the bed of a natural watercourse, the communities of one or more species of live benthic invertebrates collected from the bed of a modified watercourse, the communities of one or more species of live benthic invertebrates collected from the bed of an artificial watercourse and the communities of one or more species of live benthic invertebrates collected from a rearing pond.

In a device according to the invention, the macrobenthic organisms and the meiobenthic organisms are freshwater organisms, i.e. organisms living exclusively in freshwater. The macrobenthic organisms and meiobenthic organisms of a device according to the invention are organisms collected from the bed of a watercourse or from a freshwater pond, particularly a pond for rearing said macrobenthic and meiobenthic organisms.

A "community of at least one species" refers to an assemblage of one or more species. Such a community can be composed of a single species of live benthic invertebrate or a plurality of distinct species of live benthic invertebrates. The term "species" defines the lower taxon of the systematic classification of organisms. Organisms from the same species have common characteristics—particularly morphological, genetic, biotope and behavioral characteristics—such that organisms of the same species are capable of sexual reproduction with one another.

Such a community of one or more species of live benthic invertebrate(s) comprises between 1 and 200 species of live benthic invertebrate(s), particularly more than 5 distinct species of live benthic invertebrates, in particular more than 30 distinct species of live benthic invertebrates, preferably of the order of 50 distinct species of live benthic invertebrates. Such a community of one or more species of live benthic invertebrate(s) is in particular representative of the biodiversity of the hyporheic environment of a watercourse.

This collecting is carried out by methods that are known per se to the person skilled in the art. In particular, a device—known as a Surber net—having a rigid and optionally foldable frame and a high-strength cloth net, particularly made of polyester, is used. The size of the substantially square meshes of the cloth net is selected to permit the capture of organisms of a size greater than or equal to the mesh size used. For example, a Surber net having a mesh size of 250 µm is used. Collection is made from the upper layer of sediments of the watercourse. The thickness of the sediment layer collected can vary from several centimeters to about ten centimeters.

Advantageously and according to the invention, the ratio of the dry weight, expressed in mg, of benthic (macrobenthic and meiobenthic) organisms contained in the container and the volume (in $dm^3$) of aggregate contained in the container is greater than 5 $mg/dm^3$, particularly from 5 $mg/dm^3$ to 100 $mg/dm^3$, preferably from 10 $mg/dm^3$ to 50 $mg/dm^3$, in particular of the order of 20 $mg/dm^3$. The dry weight of the benthic (macrobenthic and meiobenthic) organisms corresponds to the dry weight of the biomass made up of the benthic organisms and added live into the water sanitizing device.

Advantageously and according to the invention, the wastewater sanitizing device additionally comprises at least one oligochaete worm selected from the sub-group made up of the species *Limnodrilus hoffmeisteri*, *Limnodrilus claparedeanus* and *Tubifex tubifex*. These oligochaete worms are commercially available but can also be collected from the natural bed of a watercourse.

Advantageously and according to the invention, the wastewater sanitizing device additionally comprises at least one crustacean of the sub-group of the Aselidae, particularly of the species *Asellus aquaticus*.

Advantageously and according to the invention, the device comprises a tank capable of containing a quantity of liquid wastewater, said tank belonging to a circuit for circulating said liquid wastewater between said tank and the inlet of the container and for returning the substantially decontaminated water between the outlet of the container towards the fluid inlet of said container via the tank.

Advantageously and according to the invention, the sanitizing device comprises means of oxygenating the substantially decontaminated water with a gaseous fluid. The inventors have observed that the substantially decontaminated water at the outlet of the container is also substantially deoxygenated water, i.e. having an oxygen content lower than the oxygen content of the wastewater at the inlet of the container before treatment.

Advantageously and according to the invention, the means of oxygenating the substantially decontaminated water are placed at the outlet of the container, particularly in the tank. In particular, this oxygenation of the substantially decontaminated water is performed by bubbling a gaseous fluid containing oxygen, particularly atmospheric air, into the tank of substantially decontaminated water.

Advantageously, the means of oxygenating the substantially decontaminated water are made up of an air bubbler capable of permitting the introduction of oxygen into the substantially decontaminated water and its aeration in such a way as to maintain a predetermined minimum content of gaseous oxygen in the substantially decontaminated water. The means of oxygenating the substantially decontaminated water are suitable for maintaining in said substantially decontaminated water an oxygen level corresponding to a value of from 80% to 100% of the oxygen saturation value of the water. This oxygen saturation value of the water is of the order of 9 mg of $O_2$/L of water at 20° C. The inventors have observed that the oxygen level of the substantially decontaminated water at the outlet of the container is actually less than 5 mg of $O_2$/L of water, in particular from 0 to 5 mg of $O_2$/L of water. The inventors have observed that the treatment according to the invention of a wastewater leads to its depletion in oxygen as it passes through the container.

Advantageously and according to the invention, the sanitizing device comprises means, referred to as circulating means, of collecting the substantially decontaminated water—which is also substantially deoxygenated water—at the outlet of the container and of reintroducing said substantially decontaminated water at the inlet of the container via the tank, in which the substantially decontaminated and deoxygenated water is reoxygenated.

In a device according to the invention, there is therefore a succession of an aerobic phase (at the inlet of the container) and an anaerobic phase (at the outlet of the container). The inventors believe that a succession of aerobic and anaerobic phases obtained by oxygenation of the substantially decontaminated water and circulation of said substantially decontaminated and oxygenated water enables the efficiency of the decontamination treatment to be improved. The inventors believe that the aerobic microorganisms of the biofilm distributed close to the fluid inlet of the container are responsible for the aerobic steps of the wastewater contaminant degradation and that the anaerobic microorganisms of the biofilm distributed close to the fluid outlet of the container are responsible for the anaerobic steps of the wastewater contaminant degradation.

The inventors believe that the combination of the aggregate, the biofilm, the macrobenthic organisms and the meiobenthic organisms, in particular the community of one or more species of benthic invertebrate organisms comprising a proportion of detritivorous invertebrate organisms of from 60% to 80%, permits the formation and the maintenance:

- of oxygen-rich aerobic zones which permit the development of aerobic microorganisms and
- of oxygen-depleted, or even substantially anoxic, anaerobic zones, which permit the development of facultative or obligate anaerobic microorganisms;

and that the succession of these aerobic and substantially anaerobic zones through which the wastewater flows in the sanitizing device according to the invention permits the degradation of wastewater contaminants.

Advantageously, in a first variant of a device according to the invention, the container has a substantially right circular cylindrical shape with a substantially vertical rotational axis and having a first upper opening comprising the inlet for the liquid wastewater and a second lower opening comprising the outlet for the substantially decontaminated water.

In this first variant, the container of the liquid wastewater sanitizing device is a water filter column having an inlet for liquid wastewater extending in the upper part of said filter column and an outlet for substantially decontaminated water extending below said inlet for liquid wastewater and in the lower part of said filter column. The filter column can have any diameter and any length suitable for accommodating the aggregate and for permitting a flow of the liquid wastewater between the fluid inlet and outlet of said filter column.

As a non-limiting example of a variant of a device according to the invention made up of a filter column, the solid particles of the aggregate are distributed within the container in the form of a superimposed sequence of layers of solid particles, each layer of solid particles extending on the surface of a lower layer of solid particles, over a thickness of from 2 cm to 4 cm and in a direction substantially perpendicular to the average flow of water in said filter column. Each of the successive layers in the superimposed sequence of layers of solid particles has a particle size different from the particle size of the two immediately adjacent layers. In this example, a device according to the invention comprises an aggregate held within the container, said aggregate being made up of a succession of layers of solid particles, each of the layers of solid particles being selected from the group made up of solid particles having an average particle size of from 5 mm to 20 mm, particularly of the order of 15 mm and known as "gravels", solid particles having an average particle size of from 0.3 mm to 0.6 mm, particularly of the order of 0.5 mm, known as "pea sand" and solid particles having an average particle size of from 0.05 mm to 0.5 mm, particularly sand. In addition, in this variant of a device according to the invention, the lower layer of the aggregate is made up of a layer of gravel as defined above and extending over a thickness of the order of 15 mm.

Advantageously, the aggregate has a size distribution of the solid particles which is substantially homogeneous in the container. A substantially homogeneous size distribution means that the solid particles are not distributed in the container according to a size gradient in which the solid particles of larger size would form a lower layer of aggregate in the container, the solid particles of intermediate size would form an intermediate layer of aggregate in the container and the solid particles of smaller size would form an upper layer of aggregate in the container.

Advantageously, in a second variant of a device according to the invention, the container is a pond configured to permit a supply of liquid wastewater to said pond, a circulation of the liquid wastewater in contact with the aggregate in the pond and an outlet of the substantially decontaminated water.

The pond for sanitizing liquid wastewater can have any possible shape and any possible dimensions—particularly any diameter—suitable for accommodating the aggregate and for permitting a flow of liquid wastewater between the fluid inlet and outlet of said pond for sanitizing wastewater.

The invention also extends to a method for treating liquid wastewater for the purpose of its decontamination, in which:
- an aggregate made up of solid particles is selected, and then
- said aggregate is placed within a container suitable for being able to maintain contact between said aggregate and a flow of percolating liquid water flowing in said container, and then
- a flow of the percolating liquid water in contact with the aggregate is formed between:
  - a liquid water inlet of the container, and
  - a liquid water outlet of the container;

and said flow is maintained for a specified period together with conditions suitable to permit the establishment of a community, referred to as a community of microorganisms, of at least one species of microorganism(s), particularly in the form of a biofilm, on the surface of and in contact with the mineral particles of the aggregate and to form a matrix suitable for the development of said community of microorganisms, and then the following are selected:
- at least one live benthic invertebrate from the group made up of the live benthic invertebrates referred to as macrobenthic organisms, having an average size greater than 250 µm, and said macrobenthic organism(s) is/are distributed in the aggregate;
- at least one live benthic invertebrate from the group made up of the live benthic invertebrates referred to as meiobenthic organisms, having an average size of from 50 µm to 250 µm, and said meiobenthic organism(s) is/are distributed in the aggregate, the macrobenthic organisms and meiobenthic organisms forming a community of one or more species of benthic invertebrate organisms comprising a proportion of detritivorous invertebrate organisms, expressed as a percentage of the dry weight of the detritivorous invertebrate organisms and of the dry weight of the benthic invertebrate organisms of said community of one or more species, of from 60% to 80%, particularly of the order of 75%, and then a flow of the liquid wastewater is introduced into the container in such a way as to permit its decontamination and the formation of a flow of substantially decontaminated water, having a reduced oxygen content in relation to the liquid wastewater, at the liquid water outlet of the container.

Advantageously, the percolating water comprises a level of carbon (C) from organic matter of from 10 mg to 20 mg/L of percolating water, particularly of the order of 15 mg/L of percolating water.

Advantageously, the percolating water comprises a level of nitrogen (N) from organic matter of from 5 mg to 15 mg/L of percolating water, particularly of the order of 10 mg/L of percolating water.

Advantageously, the live benthic invertebrates (macrobenthic organisms and meiobenthic organisms) are collected by filtration of the water flowing in contact with the sediments of the natural bed of a watercourse or by suspension of the sediments forming the surface layer, particularly extending over a thickness of the order of 15 cm, collection and filtration in a "Surber"-type net.

Advantageously and according to the invention, the community of one or more species of live benthic invertebrate organisms is collected by filtration from a sediment selected from the group made up of the sediments of the bed of a natural watercourse, the sediments of the bed of a modified watercourse, the sediments of the bed of an artificial watercourse and the sediments of a rearing pond, particularly from a rearing pond for said live benthic invertebrates.

In an advantageous variant of a method according to the invention, the community of one or more species of live benthic invertebrate organisms is collected by filtration from the sediments constituting the bed of an artificial watercourse, particularly from the sediments constituting the bed of an artificial watercourse or rearing pond for said community of one or more species of live benthic invertebrate organisms. In this variant of a method according to the invention, depletion of the macrobenthic and meiobenthic fauna of a natural watercourse is avoided.

Advantageously and according to the invention, the macrobenthic and meiobenthic organisms are added simultaneously to the container holding the aggregate in such a way that the ratio of the dry weight of the meiobenthic organisms and the dry weight of the benthic organisms (macrobenthic and meiobenthic) is from 5% to 10%.

Advantageously a method according to the invention is suitable for being able to allow a treatment to prevent clogging of the liquid wastewater sanitizing device.

Advantageously and according to the invention, the substantially decontaminated water is recycled at the water outlet of the container and said substantially decontaminated water is introduced at the water inlet of said container.

The invention is additionally directed to such a method for the purpose of reducing the nitrogen level in contaminated water.

The invention is additionally directed to such a method for the purpose of reducing the level of plant protection agent in contaminated water.

The invention is also directed to the use of a device according to the invention for the purpose of reducing the level of nitrogen, particularly of nitrate, nitrite and ammonia, in contaminated water.

The invention is also directed to the use of a device according to the invention to reduce the level of plant protection agent(s), particularly of a biocidal agent, in contaminated water.

The invention likewise relates to a device, a method for sanitizing wastewater and the use of such a device characterized in combination by all or some of the characteristics mentioned above or below.

Other aims, characteristics and advantages of the invention will be seen upon reading the examples of the following description which are given only by way of non-limiting examples.

Example 1—Method for Treating Nitrate-Rich Polluted Water

In a Plexiglas filter column with a circular cross-section, 7 cm in diameter and 20 cm high, successive layers of solid materials in the divided state are arranged in a superimposed sequence, the lower layer ($L_1$) having an average particle size of from 0.5 mm to 1.0 mm, the layer ($L_2$) immediately above the layer ($L_1$) having an average particle size of from 1.0 mm to 2.0 mm, the layer ($L_3$) immediately above the layer ($L_2$) having an average particle size of from 2.0 mm to 10.0 mm, the layer ($L_4$) immediately above the layer ($L_3$) having an average particle size of between 10.0 mm and 20.0 mm. The thickness of each of the successive layers of solid materials in the divided state is of the order of 4 cm. These solid materials in the divided state are obtained by screening a sand/gravel mix using calibrated screens. A porous film with an average pore size of the order of 300 µm is placed at the lower end of the filter column containing the aggregate and at the upper end of the filter column containing the aggregate, a depth of river water (Garonne, France) having a depth of the order of 2 cm is maintained. The average porosity of the aggregate in the sanitizing device is of the order of 30%.

The sanitizing device is fed with river water (Garonne, France) from an HDPE tank having a volume of 15 L by means of a peristaltic pump (323Du, Watson-Marlow) connected by an opaque silicone tube (3.2 mm in diameter) to a fluid inlet of the sanitizing device located at the upper end of said filter column. The flow rate of the river water in the sanitizing device is of the order of 7 to 8 mL/min. Such a flow rate is representative of the water flow in hyporheic sediments (Darcy rate of 1.39 to 1.59 m/day). The outlet of the container is placed in fluid communication with the tank by means of a pipe suitable for permitting a return of the substantially decontaminated water leaving the container towards the fluid inlet of said container via the tank.

The tank of river water is additionally equipped with a device for oxygenating said river water. The oxygen concentration of the river water in the tank is of the order of 9.0 mg/L and is kept constant by permanent bubbling of air into the tank.

The whole of the contaminated liquid water treatment device is placed in the dark and at a temperature of the order of 15° C. in such a way as to limit the development of a community of autotrophic microorganisms on the surface of the solid particles of the aggregate and the formation of an autotrophic "biofilm".

In a method for sanitizing water polluted by nitrates, the nitrate level of the polluted river water is measured before the addition of the benthic invertebrate organisms (for a 7-day period) and after the addition of the benthic invertebrate organisms (for a 7-day period). In this way, the rate of disappearance (expressed in mg of nitrate removed per day and per gram of organic matter) of nitrates from the polluted river water before and after addition of the community of one or more species of live benthic invertebrate is calculated.

In a first device ($D_1$) as an experimental control ($C_1$), a sterilization step of the suspension of aggregate in river water (Garonne, France) is performed before it is introduced into the filtration device. In this way, a device ($D_1$) is produced which is substantially free from "biofilm".

In a second device ($D_2$) as an experimental control ($C_2$) which is free from benthic invertebrate organisms, a circulation of river water through the aggregate is formed for a period of the order of 40 days in such a way as to permit the formation of a "biofilm" on the surface of the solid particles of the aggregate. The nitrate level of the polluted river water is measured over a first 7-day period (D 40 to D 47) and over a second 7-day period (D 48 to D 56). In this way, the rate of removal (expressed in mg of nitrate removed per day and per gram of organic matter) of nitrates from the polluted river water by the "biofilm" alone is calculated over the first and second periods.

In a third device ($D_3$) of a third experimental condition ($C_3$), a circulation of river water through the aggregate is first formed for a period of the order of 40 days in such a way as to permit the formation of a "biofilm" on the surface of the solid particles of the aggregate, and then, at the top of the sanitizing device, a community of one or more species of live benthic invertebrate, forming meiofauna, is added, collected from a tributary of the Ariège (the Lèze, Haute-Garonne, France, at a location called "La Fagette"), said live benthic invertebrate organisms having an average size of from 50 μm to 250 μm.

The composition of the meiofauna introduced into the sanitizing device ($C_3$) is given in Table 1 below.

TABLE 1

| Organism | Number of organisms |
| --- | --- |
| Lecane | 810 |
| Lepadella | 42 |
| Cephalodella & Dicranophorus | 292 |
| Notholca | 2 |
| Keratella & Cochlearis | 20 |
| Bdelloida | 457 |
| Nematodes | 38 |
| Oligochaetes | 3 |
| Phylum Tardigrada | 15 |
| Cyclopoida | 7 |
| Harpacticoida | 4 |
| Nauplius | 13 |
| Coleoptera | 1 |
| Chironomidae | 2 |
| Ephemeroptera | 1 |
| Hydracarina | 3 |
| Total number of organisms | 1710 |

The nitrate level of the polluted river water is measured over a first 7-day period (D 40 to D 47) before the addition of the meiofauna, and over a second 7-day period (D 48 to D 56) after the addition of the meiofauna. In this way, the rate of removal (expressed in mg of nitrate removed per day and per gram of organic matter) of nitrates from the polluted river water by the "biofilm" alone on the one hand and by the "biofilm" in the presence of the community of one or more species of live benthic invertebrate of the meiofauna type is calculated over the first and second periods.

In a fourth device ($D_4$) of a fourth experimental condition ($C_4$), a circulation of river water through the aggregate is first formed for a period of the order of 40 days in such a way as to permit the formation of a "biofilm" on the surface of the solid particles of the aggregate, and then, at the top of the sanitizing device, the community of one or more species of live benthic invertebrate forming the meiofauna and a community of live benthic invertebrate forming macrofauna are added, collected from a tributary of the Ariège (the Lèze, Haute-Garonne, France, at a location called "La Fagette"), said benthic invertebrate organisms having an average size greater than 250 μm.

The composition of the macrofauna introduced into the sanitizing device ($C_4$) is given in Table 2 below.

TABLE 2

| Organism | Number of organisms |
| --- | --- |
| Nematodes | 2 |
| Oligochaetes | 48 |
| Hydracarina | 47 |
| Elmis | 1 |
| Esolus | 24 |
| Limnius | 4 |
| Oulimnius | 6 |
| Macronychus | 2 |
| Ceratopogonidae | 4 |
| Chironominii | 1 |
| Tanytarsinii | 2 |
| Orthocladiinae | 7 |
| Tanyponidae | 37 |
| Hemerodromiinae | 2 |
| Tipuloidae | 1 |
| Cyclopidae | 9 |
| Indeterminate | 14 |
| Total number of organisms | 211 |

The dry mass of the macrofauna introduced into the sanitizing device ($C_4$) is 7.61 mg. The dry mass of the macrofauna introduced into the sanitizing device ($C_4$) per gram of aggregate is 1.24 μg/g.

The nitrate level in the polluted river water is measured over a first 7-day period (D 40 to D 47) before the addition of the macrofauna, and over a second 7-day period (D 48 to D 56) after the addition of the macrofauna. In this way, the rate of removal ($V_p[NO_3]$) (expressed as mg of nitrate removed per day and per gram of organic matter, $mg \cdot d^{-1} \cdot g^{-1}$) of nitrates from the polluted river water by the aggregate ($C_1$) alone without "biofilm", by the "biofilm" deposited on aggregate ($C_2$), by the "biofilm" in the presence of the community of one or more species of live benthic invertebrate of the meiofauna type ($C_3$) and by the "biofilm" in the presence of the community of one or more species of benthic invertebrate organisms of the meiofauna and macrofauna type ($C_4$) is calculated over the first and second periods.

The average values (+/−standard deviation) estimated over at least 3 containers replicating the rate ($V_r[NO_3]$) of retention of nitrates (in mg per day and per gram of aggregate are given in Table 3 below in the conditions $C_1$, $C_2$, $C_3$ and $C_4$ described above before introduction (A) of the community of one or more species of live benthic invertebrate into the sanitizing device and after introduction (B) of the community of one or more species of benthic invertebrate organisms into the sanitizing device.

TABLE 3

| | Before introduction (D 40 to D 47) | | | After introduction (D 48 to D 56) | | | |
| --- | --- | --- | --- | --- | --- | --- | --- |
| | $C_2$ | $C_3$ | $C_4$ | $C_1$ | $C_2$ | $C_3$ | $C_4$ |
| $V_p[NO_3]$ +/− SD | 13.4 +/− 7.8 | 11.8 +/− 4.5 | 14.3 +/− 10.8 | 5.7 +/− 2.9 | 16.1 +/− 5.8 | 30.0 +/− 8.5 | 49.4 +/− 13.9 |

The nitrate concentration is analyzed by a high-performance ion chromatography method. The samples are taken from the tank and filtered through a cellulose membrane filter having a porosity of 0.22 μm (VWR, Fontenay-sous-bois, France).

The organic matter content of the sanitizing devices is determined by the difference (AFDM, "Ash Free Dry Mass") between the mass of a sample of aggregate taken from a sanitizing device and dried for 48 h at 105° C. and the mass of this sample which has been dried and then treated by pyrolysis at 500° C. for 5 h and in which the organic matter is converted to ash. The quantity of organic matter in each of the devices ($D_1$), ($D_2$), ($D_3$) and ($D_4$) has a level of organic matter of the order of 6.0+/−0.9 mg of organic matter per gram of aggregate. Such a quantity of organic matter corresponds to a percentage by mass of carbon with respect to aggregate of the order of 0.6+/−0.1%. By way of example, the quantity of organic matter originating from the macrofauna in the condition ($C_4$) is 1.21 mg of organic matter per gram of aggregate, corresponding to a percentage by mass of carbon in the macrofauna with respect to carbon in the total organic matter of the order of 0.02%.

Example 2—Method for Treating Water Polluted by Diuron (N'-(3,4-dichlorophenyl)-N,N-dimethylurea, CAS 330-54-1)

Diuron (Sigma-Aldrich, Saint Quentin Fallavier, France) is an herbicide from the family of the phenylureas detected in the Garonne river in an average annual concentration of the order of 0.2 μg/L. The toxicity of diuron is proven for numerous aquatic organisms and in particular for the larvae of amphibians, particularly *Xenopus* larvae. A solution of diuron in dimethyl sulfoxide (DMSO) is prepared in a concentration of 64 mg/mL and a volume of this solution suitable to obtain a final diuron concentration of 30 μg/L in the tank water is added to the tank.

In this example, the residual presence of diuron in the decontaminated water at the outlet of a liquid wastewater sanitizing device according to the invention is analyzed by analysis of the toxicity of the decontaminated water collected at the outlet of the sanitizing device. In particular, this toxicity is analyzed with respect to the development of *Xenopus* larvae between the 50 and 54 day stages.

The wastewater sanitizing device comprises a PVC filter column having a circular cross-section, 7 cm in diameter and 20 cm high (total volume of 770 cm³). In this filter column, successive layers of solid materials in the divided state are arranged, the lower layer ($L_1$) of gravel having an average particle size of from 5 mm to 15 mm, the layer ($L_2$) of gravel immediately above the layer ($L_1$) having an average particle size of the order of 0.5 mm, the layer ($L_3$) of sand, immediately above the layer ($L_2$), the layer ($L_4$) of gravel immediately above the layer ($L_3$) having an average particle size of the order of 0.5 mm and the layer ($L_5$) of sand, immediately above the layer ($L_4$) and suitable for permitting the burial of benthic invertebrate organisms brought into the sanitizing device. The thickness of each of the successive layers of solid materials in the divided state is of the order of 2.5 cm.

These solid materials in the divided state are obtained by screening a sand/gravel mix through calibrated screens. A porous film having a porosity of the order of 300 μm is placed at the lower end of the filter column containing the aggregate of solid particles and at the upper end of said filter column containing the aggregate a depth of river water (Garonne, France) having a depth of the order of 2 cm is maintained.

The sanitizing device is supplied with river water (Garonne, France) from a tank having a volume of 100 L by means of a peristaltic pump (323Du, Watson-Marlow) connected by an opaque silicone tube (3.2 mm in diameter) to a fluid inlet of the sanitizing device located at the upper end of said water filter column. The tank of river water is additionally equipped with a device for oxygenating said river water. The oxygen concentration of the river water in the tank is kept constant by permanent bubbling of air into the tank. The average temperature of the water is of the order of 17° C.

In a method for sanitizing contaminated water according to the invention, the river water—enriched with nitrogen ($KNO_3$) and carbon (sodium acetate) by regular addition of nutrients—is circulated in the sanitizing device for a period of the order of 48 days in such a way as to permit the formation of the "biofilm" on the surface of the aggregate.

A community of one or more species of live benthic invertebrate is then (D 49) added to the sanitizing device. A quantity of diuron (8 mg/L) is introduced (D 60) into the river water and the circulation of the river water contaminated by diuron and enriched in $KNO_3$ and sodium acetate in the decontamination device is continued. River water samples are taken daily at the outlet of each sanitizing device.

In a first sanitizing device ($D_5$) used in a condition ($C_5$) of a method for treating contaminated water according to the invention, macrofauna and meiofauna as described in example 1 are added as a community of one or more species of live benthic invertebrates.

In a second sanitizing device ($D_6$) used in a condition ($C_6$) of a method for treating contaminated water according to the invention, only meiofauna as described in example 1 is added as a community of one or more species of live benthic invertebrate.

In a third control device ($D_7$) of a sanitizing device ($D_5$ and $D_6$) according to the invention, the same sequence as ($C_5$, $C_6$) is carried out but without the addition of a community of one or more species of live benthic invertebrate ($C_7$).

The toxicity results of the water collected at the outlet of the water sanitizing devices $D_5$, $D_6$ and $D_7$ according to the invention after 18 days of circulation of said water in the sanitizing device are expressed in Table 4 below by the mortality of *Xenopus* larvae exposed to water obtained after 18 days of treatment in the device.

TABLE 4

|  | $C_5$ |  | $C_6$ |  | $C_7$ |  |
|---|---|---|---|---|---|---|
| Initial diuron, μg/L | 30 |  | 30 | 15 | 30 | 15 | 7.5 |
| Mortality, % | 7 |  | 100 | 29 | 100 | 100 | 15 |

The condition $C_5$ (meiofauna and macrofauna) permits the depollution of river water contaminated with diuron and the production of river water with reduced toxicity (mortality 7%).

Example 3—Comparative Test of a Device According to the Invention and a Device Comprising Oligochaete Worms A wastewater sanitizing device ($D_8$) according to the invention was produced as described in example 2 for which, by collection from a watercourse (Lèze, Haute-Garonne, France) by means of a screen having a mesh equal to 500 μm, a community of one or more species of live benthic invertebrate is prepared, the composition of which is given in Table 5 below.

TABLE 5

| Organism | Number of individuals |
| --- | --- |
| Elmidae | 26 |
| Dryopidae | 1 |
| Chrysomelidae | 2 |
| Chironomidae | 91 |
| Tabanidae | 11 |
| Empididae | 7 |
| Athericidae | 2 |
| Ceratopogonidae | 6 |
| Psychomyidae | 1 |
| Ecnomidae | 7 |
| Hydracariens | 4 |
| Baetidae | 1 |
| Total | 159 |

The average mass (dry weight) of the community of one or more species of live macrobenthic invertebrate organisms added to the sanitizing device ($D_8$) is 25+/−4 milligrams.

The average mass (dry weight) of the community of one or more species of live meiobenthic invertebrate organisms added to the sanitizing device ($D_8$) is 1+/−3 milligrams.

In parallel, a comparative device ($D_9$) is produced in which the community of one or more species of live benthic invertebrate is substituted by oligochaete worms of the species *Tubifex tubifex*. The mass of *Tubifex tubifex* worms is of the order of 500 mg (fresh weight) per sanitizing device and is representative of the average density of these oligochaete worms in the natural environment (56 000 oligochaete worms/m² of river).

In parallel, a control device ($D_{10}$) is produced into which no benthic organism is introduced.

In the wastewater sanitizing devices ($D_8$, $D_9$ and $D_{10}$), river water (Garonne, France) is circulated throughout the entire period of the experiment (73 days) in such a way as to permit the formation of the "biofilm" on the surface of the solid particles of the aggregate. For the first 62 days of circulating said river water (free from diuron) in the sanitizing devices ($D_8$, $D_9$ and $D_{10}$), a quantity of sodium acetate is added to the tank in such a way as to maintain the sodium acetate concentration in the tank at a value of the order of 30 mg of carbon/L and a quantity of potassium nitrate in such a way as to maintain the potassium nitrate concentration in the tank at a value of the order of 50 mg of nitrate per liter.

On the 49th day of circulating the river water supplemented with nutrients, a community of one or more species of live benthic invertebrate ($D_8$) and a quantity of oligochaete worms—*Tubifex tubifex*—($D_9$) are introduced into the filter column of the sanitizing devices ($D_8$ and $D_9$) respectively.

Diuron is then added to the tank of the three devices ($D_8$, $D_9$ and $D_{10}$). After 10 days of circulating the water in the sanitizing device, the toxicity of the water in the tank of each of the three devices ($D_8$, $D_9$ and $D_{10}$) is analyzed by exposure of *Xenopus* larvae to water from the tank of each of the devices ($D_8$, $D_9$ and $D_{10}$). The following controls are additionally carried out:

exposure of *Xenopus* larvae to untreated river water in a wastewater sanitizing device (negative control T(−));

exposure of *Xenopus* larvae to river water containing 286 μL of DMSO as diuron solvent (control $T_{DMSO}$);

exposure of *Xenopus* larvae to river water containing a genotoxic compound, cyclophosphamide, at a concentration of 20 mg/L (positive control T(+));

exposure of *Xenopus* larvae to water from the tank of a water sanitizing device ($D_{11}$) without a "biofilm" or a community of one or more species of live benthic invertebrate;

exposure of *Xenopus* larvae to water from the tank of a water sanitizing device ($D_{10}$) with "biofilm" but without a community of one or more species of live benthic invertebrate;

exposure of *Xenopus* larvae to water from the tank of a water sanitizing device ($D_9$) with "biofilm" and oligochaete worms;

exposure of *Xenopus* larvae to water from the tank of a water sanitizing device ($D_8$) with "biofilm" and a community of one or more species of live benthic invertebrate.

The acute toxicity of the sanitized water is measured by incubating *Xenopus* larvae, selected at a stage of development of 50 to 54 days, for a period of 12 days with said sanitized water on larvae. This measurement permits observation of the signs of intoxication of the larvae induced by exposure to the water obtained at the outlet of the sanitizing device at the end of treatment. The results are given in Table 6 below.

TABLE 6

| Toxicity | T(−) | $T_{DMSO}$ | T(+) | $D_{11}$ | $D_{10}$ | $D_9$ | $D_8$ |
| --- | --- | --- | --- | --- | --- | --- | --- |
| 1 to 5 days | No toxicity | No toxicity | Lethal toxicity | Lethal toxicity | Lethal toxicity | Lethal toxicity | Low toxicity |
| 5 to 12 days | No toxicity | No toxicity | Lethal toxicity | Lethal toxicity | Lethal toxicity | Lethal toxicity | Growth slowed and halted |

Genotoxicity results, measured in accordance with the standard ISO 21427-1 (November 2006, Water quality—Evaluation of genotoxicity by measurement of the induction of micronuclei—Part 1: Evaluation of genotoxicity using amphibian larvae) indicate confirmed genotoxicity in the positive control T(+) significantly greater than that of the negative control T(−) and than that of the sanitized water obtained by a method according to the invention ($D_8$).

The presence of the community of one or more species of live benthic invertebrates described in Table 5 in the wastewater sanitizing device ($D_8$) permits the production of decontaminated water having reduced toxicity to *Xenopus* larvae, compared with the water obtained with a device ($D_9$) comprising only oligochaete worms.

The invention claimed is:

1. A device for sanitizing liquid wastewater, comprising:
a container holding an aggregate of solid particles and permitting contact between the solid particles of the aggregate and liquid wastewater flowing in said container between an inlet for said liquid wastewater into said container, and an outlet for substantially decontaminated water from the container;

a community of at least one species of microorganism growing on the surface of and in contact with the solid particles of the aggregate and forming a matrix, wherein said community of microorganisms develops;

at least one live benthic invertebrate selected from the group consisting of invertebrate macrobenthic organisms, having an average size greater than 250 µm, said macrobenthic organism(s) being distributed in the aggregate; and at least one live benthic invertebrate selected from the group consisting of invertebrate meiobenthic organisms, having an average size of from 50 µm to 250 µm, said meiobenthic organism(s) being distributed in the aggregate, wherein the macrobenthic organisms and the meiobenthic organisms form a community of species of benthic invertebrate organisms comprising a proportion of detritivorous invertebrate organisms, expressed as a percentage of the dry weight of the detritivorous invertebrate organisms and of the dry weight of the benthic invertebrate organisms of said community, of from 60% to 80%.

2. The device according to claim 1, wherein the aggregate presents a ratio between the void volume capable of being occupied by water in the aggregate and the volume of said aggregate in the container of from 20% to 40%.

3. The device according to claim 1, wherein the macrobenthic organisms are selected from the group consisting of: organisms of the phylum of hirudineans, organisms of the phylum of oligochaetes, organisms of the phylum of arthropods, and Ere organisms of the phylum of mollusks.

4. The device according to claim 1, wherein the meiobenthic organisms are selected from the group consisting of: organisms of the phylum of nemathelminths, organisms of the phylum of cladocerans, organisms of the phylum of ire rotifers, organisms of the phylum of copepods, organisms of the phylum of gastrotrichs and organisms of the phylum of foraminifers, and organisms of the phylum of tardigrades.

5. The device according to claim 1, wherein the community of microorganisms comprises unicellular microorganisms selected from the group consisting of bacteria, algae, fungi and protozoans.

6. The device according to claim 1, wherein the macrobenthic organisms are from a community of at least one species of live benthic invertebrate selected from the group consisting of: communities of one or more species of live benthic invertebrate(s) collected from a bed of a natural watercourse, communities of one or more species of live benthic invertebrate(s) collected from a bed of a modified watercourse, communities of one or more species of live benthic invertebrate(s) collected from a bed of an artificial watercourse, and communities of one or more species of live benthic invertebrate(s) collected from a rearing pond.

7. The device according to claim 1, wherein the meiobenthic organisms are from a community of at least one species of live benthic invertebrate selected from the group consisting of: communities of one or more species of live benthic invertebrate(s) collected from a bed of a natural watercourse, communities of one or more species of live benthic invertebrate(s) collected from a bed of a modified watercourse, communities of one or more species of live benthic invertebrate(s) collected from a bed of an artificial watercourse, and communities of one or more species of live benthic invertebrates collected from a rearing pond.

8. The device according to claim 1, wherein the ratio of the dry weight of the live benthic invertebrate organisms contained in the container and the volume of the aggregate contained in the container is greater than 5 mg/dm$^3$.

9. The device according to claim 1, comprising a tank configured for containing a quantity of liquid wastewater, said tank belonging to a circuit for circulating said liquid wastewater between said tank and the inlet of the container and for returning the substantially decontaminated water between the outlet of the container towards the fluid inlet of said container via the tank.

10. The device according to claim 1, comprising means of oxygenating the substantially decontaminated water with a gaseous fluid.

11. The device according to claim 9, further comprising a circulator configured for collecting the substantially decontaminated water at the outlet of the container and reintroducing said substantially decontaminated water at the inlet of the container via the tank.

12. A method for treating liquid wastewater for the purpose of its decontamination, the method comprising:

selecting an aggregate made up of solid particles, placing said aggregate within a container configured to maintain contact between said aggregate and a flow of percolating liquid water flowing in said container, forming a flow of the percolating liquid water in contact with the aggregate between a liquid water inlet of the container, and a liquid water outlet of the container, maintaining said flow for a specified period of time, together with conditions suitable to establish a community of at least one species of microorganism(s) on the surface of and in contact with the particles of the aggregate, and to form a matrix wherein said community of at least one species of microorganism(s) develops, selecting the following:

at least one live benthic invertebrate selected from the group consisting of the live invertebrate macrobenthic organisms, having an average size greater than 250 µm, and said macrobenthic organism(s) is/are distributed in the aggregate, and at least one live benthic invertebrate selected from the group consisting of the live invertebrate meiobenthic organisms, having an average size of from 50 µm to 250 µm, and said meiobenthic organism(s) is/are distributed in the aggregate, the macrobenthic organisms and meiobenthic organisms forming a community of benthic invertebrate organisms comprising a proportion of detritivorous invertebrate organisms, expressed as a percentage of the dry weight of the detritivorous invertebrate organisms and of the dry weight of the benthic invertebrate organisms of said community of one or more species, of from 60% to 80%, and introducing a flow of the liquid wastewater into the container in such a way as to permit its decontamination and formation of a flow of substantially decontaminated water at the liquid water outlet of the container.

13. The method according to claim 12, wherein the community of species of live benthic invertebrate(s) is collected by filtration from a sediment selected from the group consisting of: sediments of a bed of a natural watercourse, sediments of a bed of a modified watercourse, sediments of a bed of an artificial watercourse, and sediments of a rearing pond.

14. The method according to claim 12, wherein said method permits a treatment of the liquid wastewater and prevents clogging of said container.

15. The method according to claim 12, wherein the level of nitrogen in the substantially decontaminated water is reduced from that of the contaminated wastewater.

16. The method according to claim 12, wherein a level of plant protection agent in the contaminated wastewater is reduced.

* * * * *